United States Patent [19]
Kauneckas

[11] 3,843,956
[45] Oct. 22, 1974

[54] DATA RECORDING SYSTEM FOR PHOTOGRAPHIC CAMERAS

[76] Inventor: John J. Kauneckas, 2301 E. St. N.W., Washington, D.C. 20037

[22] Filed: Sept. 25, 1973

[21] Appl. No.: 400,695

[52] U.S. Cl. ............................................ 354/108
[51] Int. Cl. .......................................... G03b 17/24
[58] Field of Search........................ 95/1.1; 354/108

[56] References Cited
UNITED STATES PATENTS

| | | | |
|---|---|---|---|
| 2,821,124 | 1/1958 | Enright | 95/1.1 |
| 2,987,976 | 6/1961 | Martin | 95/1.1 |
| 3,603,974 | 9/1971 | Copeland | 95/1.1 |

FOREIGN PATENTS OR APPLICATIONS

| | | | |
|---|---|---|---|
| 672,033 | 2/1939 | Germany | 95/1.1 |

*Primary Examiner*—John M. Horan
*Attorney, Agent, or Firm*—Oblon, Fisher, Spivak, McClelland & Maier

[57] ABSTRACT

A novel system is disclosed which is suitable for addition to conventional photographic cameras for permitting recording of data such as f-stop and shutter speed annotations automatically on film as the camera is operated in conventional photography. The system of the present invention includes a light emitting diode display mounted inside a camera back and positioned adjacent the edge portions of film within the camera. A pair of rotary or slide switches are mechanically coupled to the f-stop and shutter speed controls of the camera to trigger the appropriate light emitting diodes for recording the camera settings on the edges of the film. The system may be incorporated into new cameras as they are manufactured, or it may be distributed as a kit for addition to existing cameras.

13 Claims, 15 Drawing Figures

DATA RECORDING SYSTEM FOR PHOTOGRAPHIC CAMERAS

BACKGROUND OF THE INVENTION

1. Field of the Invention

The present invention relates to a system for photographically recording information, and more particularly to a system for automatically recording camera settings on film.

2. Description of the Prior Art

In the art of photography it is often important to know precisely what shutter speed and f-stop settings were used to produce a particular photographic effect. For example, in many situations professional photographers will photograph the same scene a number of times using different shutter speeds and aperture or f-stop settings. Similarly, when photographs are submitted for judgement in photography contests, it is necessary to indicate precisely what aperture setting and shutter speed were used in taking the photographs. Unfortunately, conventional cameras generally do not include any apparatus for imprinting the shutter speed and aperture setting on each photographic negative. Accordingly, photographers are often required to manually record aperture settings and shutter speeds on paper and subsequently correlate these recordings with developed negatives. Naturally this procedure is cumbersome and in many cases results in error and confusion.

Consequently there is the need for a device which automatically records aperture settings and shutter speeds on photographic negatives as they are exposed, thereby eliminating the potential errors and time consuming effort involved in manually recording such data. The problem of developing a practical device for automatically recording this information is a difficult one, and has not been adequately solved in the past.

For example, attention is directed to U.S. Pat. No. 3,590,703, issued July 6, 1971 to Shigeo Ono. This patent discloses a set value indicating apparatus for single lens reflex cameras which is designed to automatically record shutter speed and lens aperture settings on film. However, the apparatus disclosed in this patent includes a complex optical and mechanical arrangement involving a large number of moving parts and is suitable for use with only a very limited selection of cameras. As a complex mechanical apparatus, the device disclosed in this patent must be built into the very heart of a camera during its manufacture, thereby rendering it difficult to service and impractical to install on existing cameras. Furthermore, the large number of parts and optical components add a great deal of highly undesirable additional weight to a camera. In addition, the cost of the precision parts involved is quite high, substantially increasing the manufacturing cost of a camera incorporating the apparatus. Thus, the device disclosed in the Ono patent lacks practicality in view of the fact that it is not suitable for adaptation to existing cameras, is expensive, heavy, difficult to service and manufacture, and includes various other numerous drawbacks which will be apparent to those skilled in the art.

Other devices for recording data on film strips are disclosed in U.S. Pat. No. 3,029,717, issued Apr. 17, 1962 to Hildebrandt and U.S. Pat. No. 3,603,974, issued Sept. 7, 1971 to Copeland, Jr.. The devices disclosed in these patents employ electroluminescent techniques for recording data on photographic film in lieu of the complicated mechanical and optical system disclosed in Ono. However the systems disclosed in Hildebrandt and Copeland, Jr. merely record timing signals and the like on film, and are thus significant primarily in high-speed motion picture devices, and the like, where such timing signals are important. The devices disclosed in these references do not, however, solve the problems mentioned above of automatically recording aperture settings and shutter speeds on photographic negatives as they are being exposed.

In summary, the prior art does not disclose a light weight, inexpensive, practical apparatus for automatically recording aperture and shutter speed settings on photographic film. Nor does the prior art disclose a convenient apparatus of this type which can be either built into new cameras or easily added to existing cameras.

SUMMARY OF THE INVENTION

Accordingly, one object of the present invention is to provide a novel system for recording data on photographic film.

Another object of the present invention is to provide a low cost, easily fabricated system for automatically recording selected data on photographic film.

Yet another object of this invention is the provision of a unique apparatus which can be built into new cameras as they are assembled or added to existing cameras for permitting the recording of camera settings on photographic film.

Yet another object of this invention is the provision of a novel electroluminescent system for automatically recording shutter aperture and speed settings on photographic film as pictures are being taken.

Still another object of the present invention is the provision of a novel method for automatically recording shutter aperture and speed settings on film while pictures are being taken.

Briefly, these and other objects of the invention are achieved by mounting a light emitting diode display in a camera back such that the light emitting diodes engage edge portions of film within the camera. A switching system for controlling the light emitting diode display is coupled to the aperture and shutter speed adjusting mechanisms of the camera whereby the light emitting diode display is automatically adjusted to record the appropriate camera settings on edge portions of the film.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
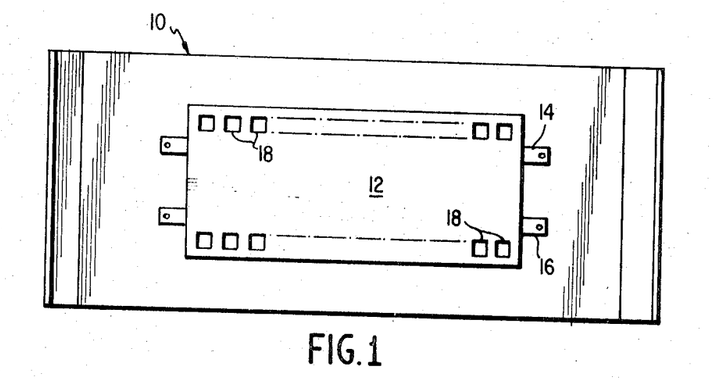
FIG. 1 is a plan view of the interior structure of a camera back.
Figure 2:
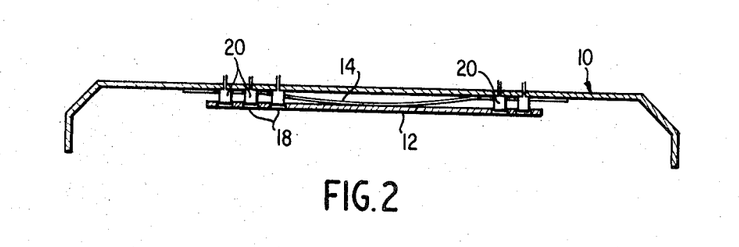
FIG. 2 is a top view of the camera back illustrated in FIG. 1.

Referring now to the drawings, wherein like reference numerals designate identical or corresponding parts throughout the several views, and more particularly, to FIG. 1 thereof, a camera back 10 is shown. The camera back 10 is preferably a completely detachable camera back of the type included on many 35 millimeter cameras, such as the Nikon model F camera. However, the camera back 10 may be any equivalent type of camera back which is either completely removable from a camera or attached to the camera by an appropriate hinge. It will be understood by those skilled in the art that every camera includes a back, or equivalent portion, which opens to provide access to the interior of the camera for the purpose of loading and removing film. A film backing plate or pressure plate 12 is resiliently mounted to the camera back 10 by means of a pair of conventional leaf springs 14 and 16. The leaf springs are fastened to the camera back 10 and to the film backing plate 12 by any suitable conventional means, such as riveting or welding. The film backing plate 12 acts as a resiliently mounted bearing surface for directly engaging film in the camera and for ensuring that the film is lying flat across the focal plane of the camera lens. According to one embodiment of the present invention, a plurality of apertures 18 are punched or otherwise formed along the upper and lower edges of the film backing plate 12 for the purpose of accommodating a like plurality of light sources 20, as shown in FIG. 2. The number of apertures 18 required depends upon the type of indicator display which is to be used, as will become apparent from the subsequent disclosure material.

The light sources 20 are preferably light emitting diodes (LEDs) which may be of any type now commercially available. As is well known by those skilled in the art, a light emitting diode is a PN junction that emits light when biased in the forward direction. These solid state devices are now being produced in smaller and smaller sizes, making them ideal for use in confined spaces as in modern cameras. Furthermore, these devices operate at low voltages, consuming very small amounts of power, and emit light of a relatively low intensity, thereby rendering them especially suitable for use in the system of the present invention.

Figure 3:
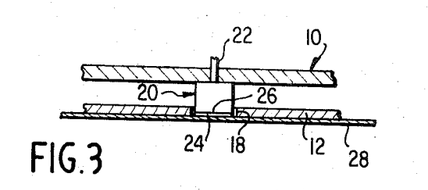
FIG. 3 is an enlarged view of a portion of the structure illustrated in FIG. 2 showing in greater detail the mounting of a light source in the camera back.
Figure 4:
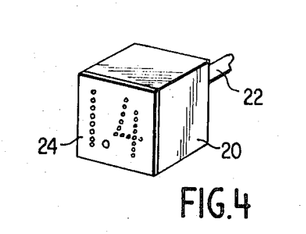
FIG. 4 is a front view of the light source illustrated in FIG. 3.

Referring now to FIG. 3, the manner in which the light sources 20 are mounted to the camera back 10 and the film backing plate 12 is illustrated in greater detail. The light sources 20 are normally securely fastened to the interior surface of the camera back 10 by means of an epoxy resin or an equivalent glue or fastening technique. The power supply terminals 22 of the light sources 20 preferably protrude through the camera back 10 to permit a power source, such as a small battery, to be coupled to the light sources. Each aperture 18 formed in the film backing plate 12 is preferably of a size and shape which conforms closely to the size and shape of the main body portion of the light sources 20. Thus the film backing plate 12 is capable of relative motion with respect to the light sources 20. In the embodiment of the invention illustrated in FIG. 3, a template or coding stencil 24 is fixed to a flat front surface 26 of the light source 20. The template 24 is shown in greater detail in FIG. 4 as having a particular code or number engraved therein by a suitable etching technique, or by any equivalent means. In the embodiment of the invention illustrated in FIG. 3, the template 24 normally abuts against the edge portion of a film strip positioned within the camera. Normally when the camera back is opened, the leaf springs 14 and 16 are not compressed, and the film backing plate 12 extends slightly beyond the template 24 at the end of each light source 20. However, when the camera back is closed and the camera is loaded and ready to be used, the leaf springs 14 and 16 are slightly compressed so that the film backing plate 12 is pressed firmly against film strip 28 so that the light sources 20 are fully inserted into the apertures 18 and the templates 24 abut the film strip. Thus when the light sources 20 are energized, the light generated thereby exposes a portion of the film in a pattern defined by the template 24.

Figure 5:
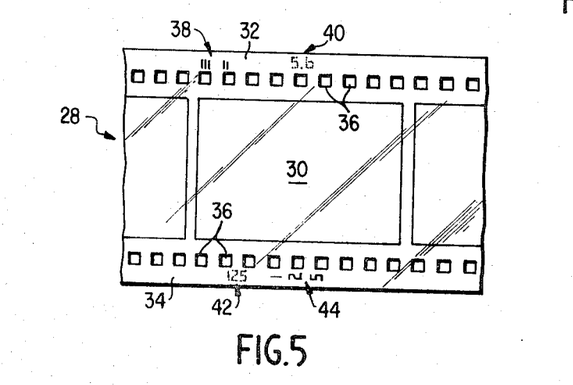
FIG. 5 is an illustration of a film segment having various data information encoded thereon.

Referring now to FIG. 5, an enlarged frontal view of the film strip 28 is shown. The film strip 28, which is preferably conventional 35 millimeter film, includes a picture area 30 having an upper border area 32 along one edge thereof, and a lower border area 34 along a lower edge thereof. Each of the border areas 32 and 34 includes a row of evenly spaced sprocket holes 36 which are conventionally used to drive the film strip 28 through the camera. Two sets of coded markings 38 and 40 are shown in the upper border area 32, and two additional sets of coded markings 42 and 44 are shown in the lower border area 34. These coded markings indicate various types of marking arrangements which can be used with the present invention and also serve to illustrate the preferred positions of the light sources 20 with respect to the film strip 28. As shown, the coded markings are preferably in the upper and lower border areas and between the outer extremities of the film strip 28 and the rows of sprocket holes 36. The coded markings can also be between the sprocket holes 36, and can be between the rows of sprocket holes and the picture area 30, although this arrangement can cause some interference with the image in the picture area unless extreme caution is exercised. Accordingly the illustrated arrangement with the coded markings positioned toward the outer extremities of the film is preferred. Many different types of coded markings are possible and the illustrated markings are intended merely to be representative of the various marking codes available. One code which has not been illustrated is a simple dot marking arrangement located at a particular spot with regard to the sprocket holes 36.

A second type of coding is a simple binary coding of the type illustated at 38. A numerical marking is illustrated at 40. This marking uses the embodiment of the invention illustrated in FIGS. 3 and 4 wherein one light source 20 with a suitable template 24 mounted thereon is required for each aperture setting or shutter speed setting of the camera. A similar coded marking is illustrated on the lower border area at 42. Finally, the coded marking 44 illustrates a different arrangement of numerals and also illustrates the type of coded marking which can be achieved using a three digit all numeral display of the type illustrated in FIG. 13. In the preferred embodiment of the invention the f-stop or aperture setting information is recorded along the upper border area 32 while the shutter speed setting information is recorded along the lower border area 34.

Figure 6A:
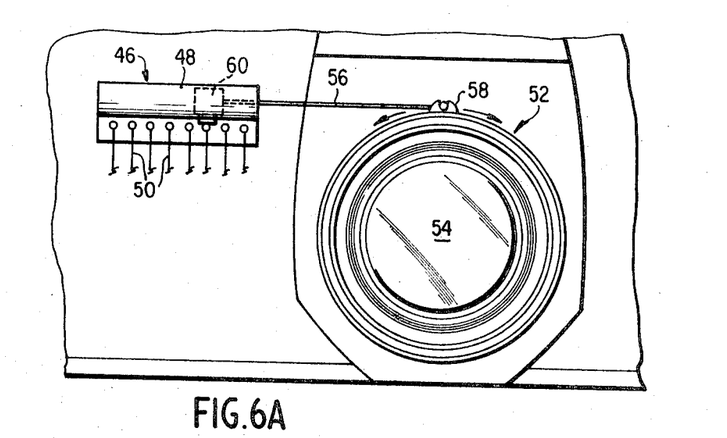
FIG. 6A is a plan view of one embodiment of a slide switch for use with the present invention.
Figure 6B:
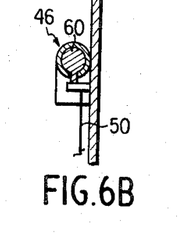
FIG. 6B is an end view of the slide switch structure shown in FIG. 6A.

FIGS. 6 through 11 illustrate various switching arrangements and techniques for coupling selector switches to camera aperture and speed adjustment mechanisms. Referring particularly to FIG. 6, a slide switch mechanism 46 including a sliding contact 48 and a plurality of output leads is shown coupled to an aperture adjustment mechanism 52 which is secured to a rotatable lens mount 54. A connecting link 56, which is capable of bending to accommodate movement of the rotatable lens mount 54 and which also exerts force along its axis is coupled between the sliding contact 48 and a mounting fixture 58 secured to the rotatable lens mount 54. In operation, a photographer rotates the lens mount 54 to change the aperture settings of the camera, thereby causing the sliding contact 48 to move into engagement with one of the output leads 50, thereby completing the circuit between the selected output lead 50 and a common or ground line 60. Since the various output leads 50 are coupled to individual light sources 20, rotation of the lens mount 54 has the effect of enabling a particular light source for activation once the camera shutter is triggered.

Figure 7:
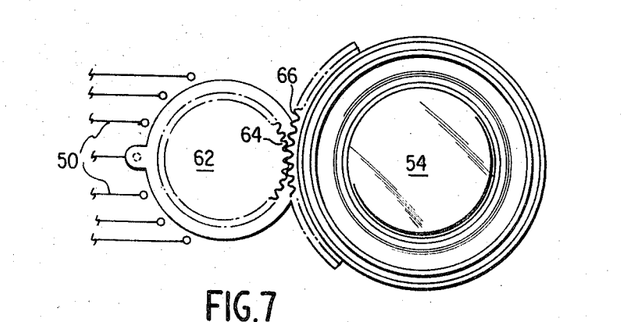
FIG. 7 is a schematic illustration of a rotary switch for engaging teeth mounted around the periphery of a lens.

Referring now to FIG. 7, a rotary selector switch 62 is shown coupled to the rotatable lens mount 54 by means of a plurality of gear teeth 64. The gear teeth 64 cooperate with similar gear teeth 66 secured to the rotatable lens mount 54. The operation of this switch is substantially identical to the slide switch 46, with the exception of the modification in its mechanical movement and coupling to the rotatable lens mount 54.

Figure 8:
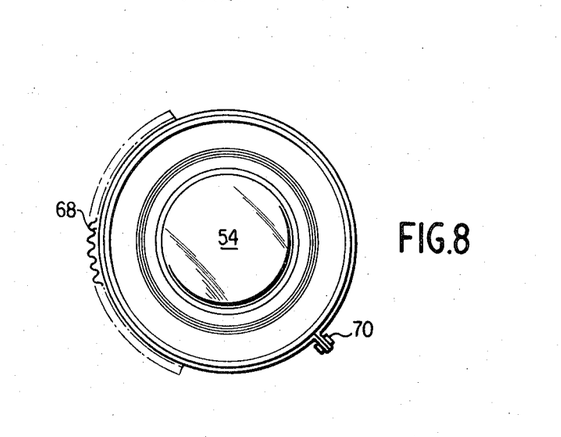
FIG. 8 is an illustration of a removable toothed band for mounting around a lens.

In some cases the camera lens mount may not possess suitable gear teeth of the type illustrated at 66 in FIG. 7. Accordingly, as shown in FIG. 8 the present invention anticipates securing a toothed band 68 around the periphery of a rotatable lens mount 54 by means of a securing bolt 70. Using this technique a rotatable lens mount having a smooth outer surface can be modified to cooperate with a gear driven rotary selector switch of the type illustrated in FIG. 7.

Figure 9:
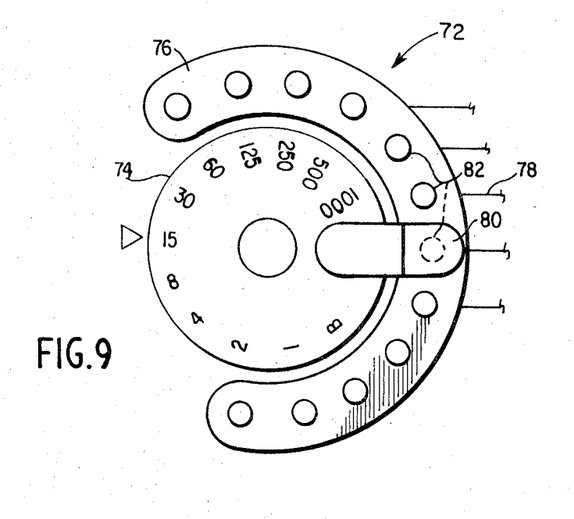
FIG. 9 is an illustration of a rotary slide switch for use with the shutter speed selector of a camera.
Figure 10:
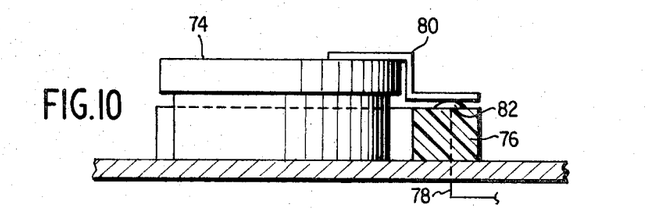
FIG. 10 is a side view of a portion of the apparatus illustrated in FIG. 9.
Figure 11:
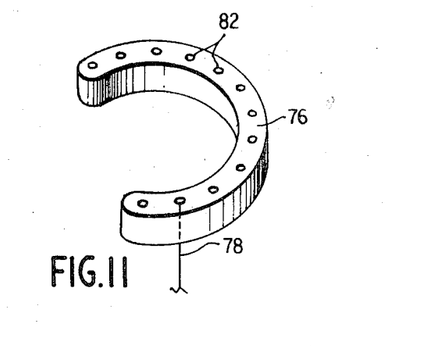

An arcuate sliding selector switch 72 for use with a rotatable shutter speed selector 74 is illustrated in FIG. 9. The arcuate selector switch 72 includes an arcuate switch body 76, illustrated in more detail in FIG. 11, to which a plurality of output leads 78 are attached. A contact member 80 is fixedly mounted to the rotatable shutter speed selector 74 for rotation therewith. As shown in FIG. 10, the contact 80 cooperates with conductive elements 82 coupled to each of the output leads 78 whereby an electrical circuit may be selectively established between the contact 80 and each of the individual output leads 78. The contact 80 is constructed of conductive material and is secured through the rotatably shutter speed selector 74 to the metal camera body, whereby a circuit is established between the selected output leads 78 and a common potential represented by the camera body. In operation, as a photographer selects a particular shutter speed by rotating the shutter speed selector 74, he enables a particular light source 20 for operation by completing a circuit through one of the output leads 78. Thus once a particular aperture setting and shutter speed are selected two circuits to two separate light sources 20 are established. By activating the camera shutter these two circuits are energized causing the separate light sources to generate light pulses which cause appropriate coded markings of the type illustrated at 38, 40, 42 or 44 to be recorded on film in the camera.

Figure 14:
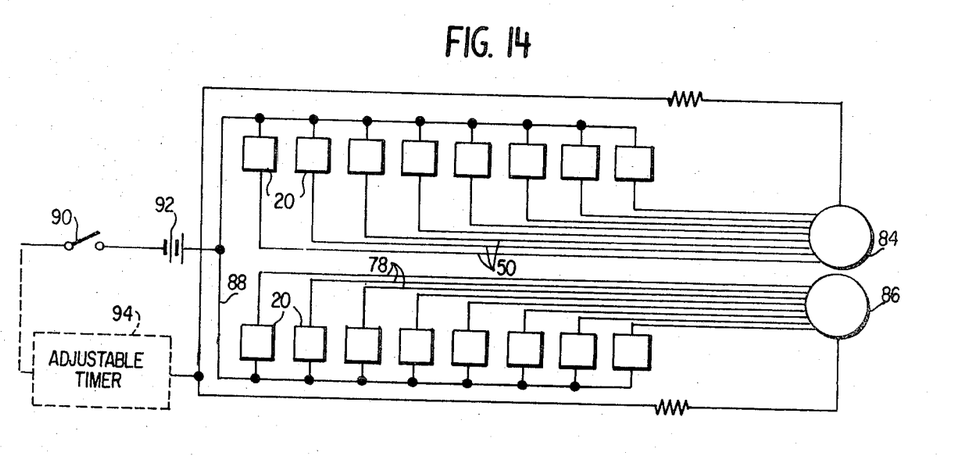

A complete wiring diagram is shown in FIG. 14. A first plurality of light sources 20 is coupled through a light plurality of output leads 50 an f-stop or aperture setting switch 84. A second plurality of light sources 20 is coupled through a plurality of output leads 78 to a shutter speed selector switch 86. It will be apparent to those skilled in the art that the number and spacing of the light sources 20 will depend upon the particular camera used and upon the number of aperture settings and shutter speeds available with the camera. Similarly, the f-stop switch 84 and the shutter speed selecting switch 86 may be any of the switches described above, or other equivalent switches. These switches complete a circuit from a common lead 88 through one light source 20 in each group to a shutter controlled switch 90 and to the positive terminal of a battery 92. The shutter controlled switch 90 may, for example, be the flash coupling of a camera. The battery 92 may be any conventional miniaturized camera battery having a suitable voltage output for powering the light sources 20. An adjustable timer 94 may alternatively be included in the circuit to permit adjustment of the time during which the light sources 20 are operating depending upon the type of film used. Suitable timing circuits are disclosed in the July 19, 1973 issue of Popular Electronics, (pages 98 and 99) and also in the June 7, 1973 issue of Electronic Design, (pages 84 through 86). It will be noted that the wiring diagram illustrated in FIG. 14 relates to the embodiment of the invention wherein a single light source 20 is used to encode a single camera setting.

Figure 12:
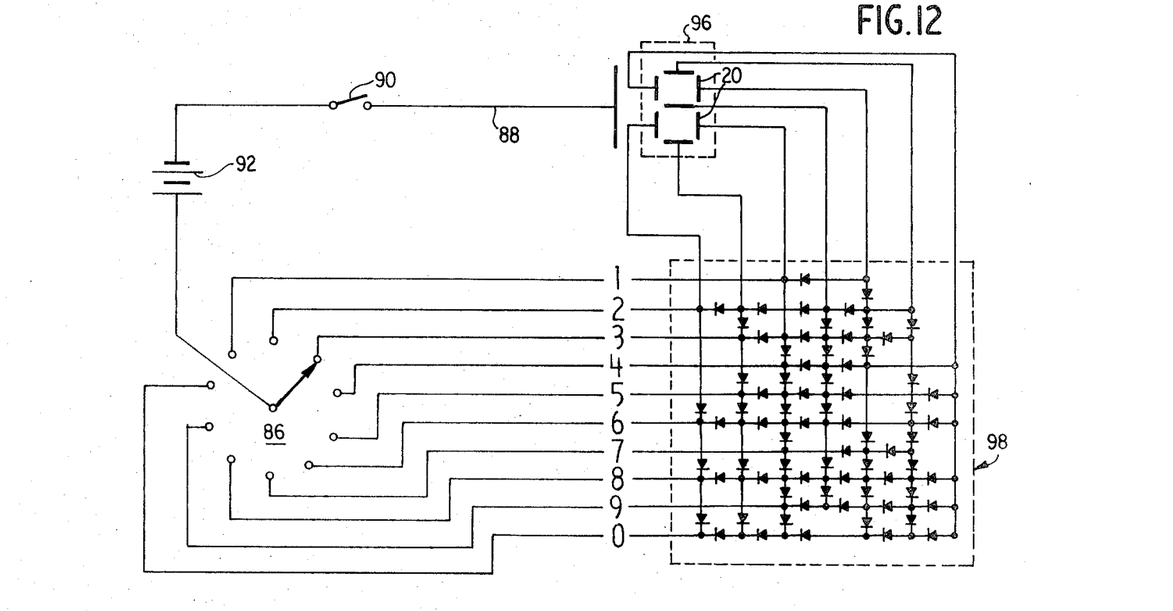
FIG. 12 is a schematic circuit diagram of an LED display circuit for use with the present invention.

Referring now to FIG. 12, a second embodiment of the invention is illustrated wherein seven of the light sources 20 are arranged to form an all digit display 96. This embodiment of the invention employs the same elements as shown in FIG. 14 with the additional requirement that a diode coding matrix 98 is required. In this embodiment of the invention a single digit can be assigned to each selected setting for either the aperture or shutter speed control so that a single digit is recorded on the film to identify each of the camera settings. The diode decoding matrix 98 may, of course, be replaced by a conventional decimal to binary converter or other similar decoding ciruitry, as is well known to those skilled in the art.

Figure 13:
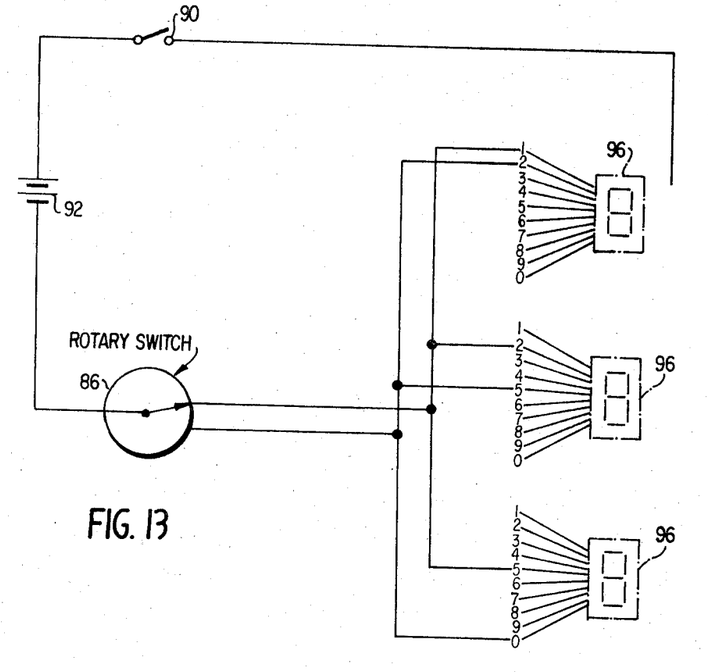
FIG. 13 is a schematic diagram of a circuit using two or more LED displays; and, FIG. 14 is a schematic circuit diagram of an alternative LED display for use with the present invention.

Referring now to FIG. 13, a multiple digit display is illustrated which can be used for imprinting on film the actual camera settings. In this case a plurality of circuits of the type illustrated in FIG. 12 and including a plurality of all digit displays 96 are combined under the control of a single camera selector switch, as illustrated at 86. It will be apparent that two systems of the type illustrated in FIG. 13 will be required, one for recording the aperture setting and one for recording the shutter speed.

Various modifications of the above-described device are possible. For example, fiber optic elements can be used to convey light from the light sources 20 to the film strip 28. Where such fiber optic elements are used the light sources 20 may be mounted outside the camera, if desired. Furthermore, coding and recording devices of the type described can be used to record additional information on film such as the use of different lenses, filters and the like. This information can be recorded between the sprocket holes 36 in a simple code of the type described above, or some variation thereof. Recording of such additional information would, of course, require the use of additional slide or rotary switches, additional light sources and a means for manually setting the additional indicator switches.

The light sources 20 can be mounted to the film backing plate 20 for movement therewith instead of being rigidly mounted to the camera back 10. Similarly, all encoding switches can be mounted either internally or externally of the camera depending upon the amount of space available inside the camera and the relative ease or difficulty of mounting the switches.

Although the present invention has been described above for use only with film having sprocket holes therein, the invention can also be used with film not having sprocket holes. In addition, the film can be modified to make it wider so that even more information can be recorded on boarder areas.

All components utilized may be either commercially available components or specially built and miniaturized components designed exclusively for use in camera housings.

As disclosed above, the light sources 20 print coded information directly on the film strip 28 in the form of a silhouette, since the light sources directly abut the film so that no optical system or focusing is required. However, in certain instances it may be desirable to include an optical system for conveying light images from the light sources 20 to the film strip 28 and for focusing these images on the film strip.

The above-described invention is both light in weight and utilizes miniaturized components so that it can be added to existing cameras, whether mounted externally or internally, without substantially increasing the bulk of the camera. Furthermore, the components are light in weight so that they do not significantly increase the weight of a camera to which they are added. The components may be assembled in kit form for distribution, or they may be added to cameras as they are being manufactured to form a permanent part of the camera. Alternatively the components may be mounted to a camera back so that a prospective purchaser can simply buy an additional camera back with the system of the present invention incorporated into it. He can thereby add or remove the system from his camera essentially by adding or removing the new back portion.

Although the light sources 20 have been described above as mounted to the back of a camera, they may also be mounted to the main body of the camera, such that they face the front of the film in the camera. This mounting configuration would be convenient when the apparatus of the present invention is built into a camera during its manufacture.

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A system for automatically recording images representative of camera settings on film comprising:
   first multiple position selector switch means adapted to be coupled to an aperture setting mechanism of said camera for identifying selected aperture settings thereof;
   first display means including a first plurality of light emitting electroluminescent devices adapted to record coded images on said film, said electroluminescent devices selectively energizable to form a plurality of said coded images, each corresponding to a predetermined setting of said first selector switch;
   a first plurality of electrical conductors coupling said electroluminescent devices in first display means and first selector switch means for permitting selection of said coded images whereby camera aperture settings may be indicated on said film;
   second multiple position selector switch means adapted to be coupled to an exposure time setting mechanism of said camera for identifying selected exposure time settings thereof;
   second display means including a second plurality of light emitting electroluminescent devices adapted to record coded images on said film, said electroluminescent devices selectively energizable to form a plurality of said coded images, each corresponding to a predetermined setting of said second selector switch; and,
   a second plurality of electrical conductors coupling said electroluminescent devices in second display means and said second selector switch means for permitting selection of said coded images whereby camera exposure time settings may be indicated on said film.

2. A system as in claim 1, wherein:
   said electroluminescent devices are light emitting diodes.

3. A system as in claim 1 wherein:
   said first and second display means are mounted in a movable camera back.

4. A system as in claim 3, further comprising:
   a film backing plate resiliently secured to said movable camera back, said film backing plate including a plurality of apertures therethrough for accommodating said electroluminescent devices and for permitting said electroluminescent devices to abut said film.

5. A system as in claim 1, wherein:
   said electroluminescent devices in said first display means are positioned adjacent an edge of said film and said electroluminescent devices in said second display means are positioned adjacent the other edge of said film.

6. A system as in claim 1, wherein:

said first and second display means each comprise one electroluminescent device for each position in said first and second selector switch means, respectively.

7. A system as in claim 1, further comprising:
a camera shutter controlled switch coupled between said first and second display means and said first and second selector switch means for triggering selected electroluminescent display devices as said camera is triggered.

8. A system as in claim 1, wherein at least one of said first and second display means includes one all digit display device.

9. A system as in claim 8, further comprising:
a diode coding matrix coupled to said all digit display.

10. A system as in claim 1 wherein:
said first and second selector switch means and said first and second display means together forming a kit designed to be mounted to conventional cameras.

11. A system as in claim 1, wherein:
said camera includes a film backing plate; and,
said first and second display means are mounted in said film backing plate.

12. A system as in claim 1, further comprising:
an electrical power circuit coupled to said first and second display means; and,
an adjustable timer means coupled to said electrical power circuit for controlling the duration of operation of said electroluminescent devices.

13. A system as in claim 1, further comprising:
coding matrix means coupled between at least one of said selector switch means and at least one of said display means.

* * * * *

UNITED STATES PATENT OFFICE
CERTIFICATE OF CORRECTION

Patent No. 3,843,956     Dated October 22, 1974

Inventor(s) John J. Kauneckas     Page 1 of 2

It is certified that error appears in the above-identified patent and that said Letters Patent are hereby corrected as shown below:

Column 6, line 56, before "diode" insert -- conventional --.

FIGURE 12, should appear as shown on the attached sheet.

UNITED STATES PATENT OFFICE
CERTIFICATE OF CORRECTION

Patent No. 3,843,956  Dated October 22, 1974

Inventor(s) John J. Kauneckas  Page 2 of 2

It is certified that error appears in the above-identified patent and that said Letters Patent are hereby corrected as shown below:

Signed and Sealed this twenty-fifth Day of May 1976

[SEAL]

Attest:

RUTH C. MASON
Attesting Officer

C. MARSHALL DANN
Commissioner of Patents and Trademarks